US006811801B2

(12) United States Patent
Nguyen et al.

(10) Patent No.: US 6,811,801 B2
(45) Date of Patent: Nov. 2, 2004

(54) METHODS AND COMPOSITIONS FOR BRIGHTENING THE COLOR OF THERMALLY PROCESSED NUTRITIONALS

(75) Inventors: Minhthy Le Nguyen, Dublin, OH (US); Bruce B. Blidner, Westerville, OH (US); Kent L. Cipollo, Westerville, OH (US)

(73) Assignee: Abbott Laboratories, Abbott Park, IL (US)

( * ) Notice: Subject to any disclaimer, the term of this patent is extended or adjusted under 35 U.S.C. 154(b) by 96 days.

(21) Appl. No.: 10/012,383

(22) Filed: Dec. 12, 2001

(65) Prior Publication Data

US 2003/0118703 A1 Jun. 26, 2003

(51) Int. Cl.⁷ .................................................. A23L 1/275
(52) U.S. Cl. ...................................... 426/250; 426/262
(58) Field of Search .................................. 426/262, 250

(56) References Cited

U.S. PATENT DOCUMENTS

| | | | | |
|---|---|---|---|---|
| 3,206,316 A | | 9/1965 | Klaui | |
| 3,539,686 A | | 11/1970 | Rosenburg | |
| 3,886,294 A | * | 5/1975 | Emodi et al. | 426/540 |
| 3,997,679 A | * | 12/1976 | Salkin | 426/250 |
| 3,998,753 A | * | 12/1976 | Antoshkiw et al. | 516/58 |
| 4,048,203 A | | 9/1977 | Philip | |
| 4,316,917 A | | 2/1982 | Antoshkiw et al. | |
| 4,504,499 A | * | 3/1985 | Finnan | 426/250 |
| 4,726,955 A | * | 2/1988 | Horn et al. | 426/73 |
| 5,023,095 A | * | 6/1991 | Kirk | 426/250 |
| 5,079,016 A | * | 1/1992 | Tood, Jr. | 426/250 |
| 5,085,883 A | | 2/1992 | Garleb et al. | |
| 5,382,714 A | | 1/1995 | Khachik | |
| 5,605,699 A | * | 2/1997 | Bernhard et al. | 424/442 |
| 5,648,564 A | | 7/1997 | Ausich et al. | |
| 5,670,548 A | * | 9/1997 | Bernhard et al. | 514/725 |
| 5,827,652 A | * | 10/1998 | Garnett et al. | 424/451 |
| 5,997,922 A | | 12/1999 | Torres-Cardona et al. | |
| 6,075,058 A | | 6/2000 | Handelman | |
| 6,093,348 A | * | 7/2000 | Kowalski et al. | 252/363.5 |
| 6,160,007 A | | 12/2000 | DeMichele et al. | |
| 6,191,293 B1 | | 2/2001 | Levy | |
| 6,194,379 B1 | | 2/2001 | McEwen et al. | |
| 6,221,412 B1 | * | 4/2001 | de Potzolli | 426/268 |
| 6,221,417 B1 | | 4/2001 | Sas et al. | |
| 6,235,315 B1 | * | 5/2001 | Runge et al. | 424/489 |
| 6,261,598 B1 | | 7/2001 | Runge et al. | |
| 6,287,615 B1 | | 9/2001 | Runge et al. | |
| 6,313,169 B1 | | 11/2001 | Bowen et al. | |
| 6,406,735 B2 | * | 6/2002 | Stein et al. | 426/540 |
| 6,500,473 B1 | * | 12/2002 | Koehler et al. | 426/89 |
| 6,582,721 B1 | * | 6/2003 | Lang | 424/439 |
| 2001/0008644 A1 | * | 7/2001 | Stein et al. | 426/73 |

FOREIGN PATENT DOCUMENTS

| | | |
|---|---|---|
| WO | WO 00/07458 | 2/2000 |
| WO | WO 01/37781 | 5/2001 |
| WO | WO 02/41711 A1 | 5/2002 |

OTHER PUBLICATIONS

Lee, H. S. 1999. Thermal Pasteurization Effects on Color of Red Grapefruit Juices. J. of Food Science 64(4)663–666.*

(List continued on next page.)

Primary Examiner—Carolyn Paden
(74) Attorney, Agent, or Firm—William J. Winter

(57) ABSTRACT

In accordance with the present invention, it has been discovered that the addition of lutein compounds to thermally processed nutritionals brightens the nutritional resulting in a more appealing color. Thermally processed liquid and powder nutritionals typically present brown and gray hues in the final color, which negatively impact the overall appeal of the nutritional. The inventors have discovered that the lutein compounds eliminate the gray and brown hues without imparting the relatively strong yellow color typically associated with lutein compounds. Additionally, the nutritionals possess long term color stability.

22 Claims, 5 Drawing Sheets

OTHER PUBLICATIONS

DFG Deutsche Forschungsgemeinschaft, DFG Farbstoffe fur Lebensmittel/ Colours for Foods, Dyestuff Commission, Second Revised Edition, 1998 p 1–4, p 2421–2422, p 4677.

Visionade, R.W. Knudsen Family, http://www.knudsenjuices.com/products/visionade.html.

Baiao, et al., "Pigmenting Efficacy of Several Oxycarotenoids on Egg Yolk", Applied Poultry Science, 1999.

Pehanich, "Lutein a Treat for the Eyes", Food Processing's Wellness Foods, Aug. 2001.

Antony, et al., "Lutein: A natural colourant and a phytonutrient for eye health protection", The World of Food Ingredients, Apr./May 2001.

"From Research to Regulations" PreparedFoods, Mar. 2000.

Downham, et al., "Colouring our Foods in the Last and Next Millennium", International Journal of Food Science and Technology 2000, 35, 5–22.

Holden, et al., "Carotenoid Content of U.S. Foods: An Update of the Database", Journal of Food Composition and Analysis 12, 169–196 (1999).

Straight Talk on Lutein Esters Xangold™, 2001 Cognis Corporation.

Haumann, "Structured Lipids Allow Fat Tailoring", INFORM, vol. 8, No. 10 (Oct. 1997).

Title 21 Chapter 9 Subchapter IV Section 350a. Infant Formulas.

Neumuller, Otto–Albrecht: "Rompps Chemie–Lexikon, Band 3" 1983, Franckh'Sche Verlagsbuchhandling, Sturrgart, Germany XP002233898 p. 2421–2422.

Neumuller, Otto–Albrecht: "rompps Chemie–Lexikon, Band 6"1988, Franckh'Sche Verlagsbuchhandling, Stuttgart, Germany XP002233899, p. 4677.

DFG Deutsche Forschungsgemeinschaft, Dyestuff Commission: "Colours for Foods" 1988, VCH Verlagsgesellschaft, Weinheim, Germany XP002233900, see "Zeaxanthin" (L–Gelb 9; CAS–No. 144–68–3).

* cited by examiner

METHODS AND COMPOSITIONS FOR BRIGHTENING THE COLOR OF THERMALLY PROCESSED NUTRITIONALS

TECHNICAL FIELD

The instant invention relates to the use of lutein compounds as brightening agents in thermally processed nutritional formulas.

BACKGROUND OF THE INVENTION

Historically, man has used color as an indication of the safety and quality of harvested fruits, vegetables and other foods. Present day customers expect processed foods to be colored attractively and with shades that are typical of their flavor variety. The first perception of a food product is its appearance and this leads to an expectation that is compatible with that which is seen. So strong is the expectation that it is possible to over-ride subsequent sensory perceptions. In judging the quality and consistency of a product, the consumer is strongly influenced by its appearance.

The color production industry aims to meet food and drink manufacture's needs by providing a full range of colors to suit all applications, within current legislative constraints. Consumer pressure, sociological changes and technological developments leading to more advances in the food processing industry have increased the overall color market. The most significant growth has been in naturally derived colors owing to the improvements in stabilization technologies as well as the food industry's aim to meet the evolving consumer perception that natural is best.

Synthetic colors, natural colors, nature identical colors, and caramel colors are the primary colorants used to color foods. Currently, the permitted synthetic pigments are in the form of water-soluble dyes. Although cited as having excellent stability, soluble dyes do lose their color in certain characteristics food manufacturing circumstances. The most common problems with soluble dyes include: decolorization by ascorbic acid; loss of color resulting from microbial attack; precipitation/color loss resulting from the presence of metal ions; masking due to formation of maillard reaction products and reaction with proteins at high temperatures causing color fade.

Likewise, caramel colors also constitute a significant segment of the overall color market principally owing to their use in cola beverage drinks. They are produced by the controlled heating of carbohydrates such as sucrose, glucose and fructose. Four classes of caramels are commercially produced for specific applications. They differ in the catalyst used to promote the caramelization process.

Nature-identical colors have been developed to match their counterparts in nature. Carotenoids are one of the most common pigments that are synthesized. Carotenoids contain conjugated hydrocarbons and are therefore prone to oxidative attack and a subsequent loss of color. Color formulations containing carotenoids have been developed with antioxidant systems to reduce this effect. For most food and drink applications, the challenge to the suppliers is to provide oil and water dispersible forms of carotenoids. This is achieved using methods such as encapsulation, emulsification and pigment suspension. By using these methods, carotenoid water and oil dispersible nature-identical colors with wide-ranging pigment contents have been developed. The shade achieved with synthesized carotenoids is dependent on the formulation and processing used and varies from golden yellow to a red/orange shade.

Significant demand for natural colorants has developed over the past 25 years. The growth in use of natural colors comes from increasing consumer pressure for "natural" products. Color is spread widely throughout nature in fruit, vegetables, seeds and roots. In our daily diets, we consume large quantities of many pigments, especially anthocyanins, carotenoids and cholorophylls. Pigments from nature vary widely in their physical and chemical properties. Many are sensitive to heat, oxidation, pH change, light and their inherent solubility varies widely. With these drawbacks in mind, suppliers of natural colors have focused on the development of currently permitted pigments in three main areas: formulation technology; processing technology; and alternative sources of pigments. These approaches have proved very successful and have contributed to the increase in usage of natural colors throughout the food and drink industry.

The xanthophyll lutein is a naturally derived pigment and until recently permitted only in chicken feed in the U.S. Lutein provides color ranging from golden yellow to red/yellow. Lutein has recently been self-affirmed as GRAS (general recognized as safe) for certain food formulations, in accordance with Food and Drug Administration guidelines. Lutein is a naturally occurring oxygenated carotenoid that has no vitamin A activity. There are three asymmetric centers in lutein at C-3, C-3' and C-6' positions. The absolute configuration of lutein in foods is known to be 3R,3'R,6'R. Lutein is found in corn, green leafy vegetables such as spinach, kale and broccoli, and yellow-orange fruits such as peaches. Its molecular structure demonstrates its highly-conjugated carotenoid nature and its structural similarity to beta-carotene.

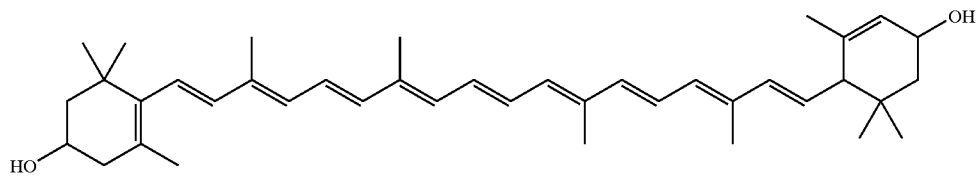

Like many other carotenoids, lutein also occurs in nature as esters of fatty acids. Lutein esters are common carotenoids found in fruits such as oranges, tangerines, peaches, mangos and yellow and red peppers. Both lutein and lutein esters are fat-soluble.

In addition to the green leafy vegetables described above, lutein is found in egg yolks and in some flowers. It has been recognized as an antioxidant, which may protect against macular degeneration, a leading cause to blindness among the elderly. Commercially, it is usually extracted from the petals of the Aztec marigold. Lutein, especially when in purified form, provides a yellow to orange shade. Traditionally marigold flowers and the saponified oleoresin have been used in poultry feed to impart yellow/orange color in egg yolk. The carotenoid composition of marigold oleoresin typically contains 70% trans-lutein, 20% cis-lutein, 7% zeaxanthin, 0.58% epoxides, 1.02% unsaponifiables and 1.4% others.

Zeaxanthin, a stereoisomer of lutein, is typically found in combination with lutein and as described in Torres-Cardona et.al. below contributes a more orange color.

U.S. Pat. No. 5,997,922 to Torres-Cardona et.al. discloses the addition of 10 to 55 ppm of saponified marigold extract to poultry feed to enhance the yellow/orange pigmentation of broiler skin and egg yolk. The saponified marigold extract has a zeaxanthin content between about 20% and 80% of the total xanthophylls.

U.S. Pat. No. 3,539,686 to Rosenberg demonstrated that it is possible to obtain a wide range of tones going from yellow to red hues in broiler skin and egg yolk by using blends of xanthophylls or zeaxanthin with one or more pigments such as cantaxanthin, beta-apo-8-carotenal, ethyl ester of the beta-apo-8-carotenoic acid, and extracts from paprika and red peppers.

U.S. Pat. No. 5,382,714 to Khachik describes a process of isolating, purifying and recrystallizing substantially pure lutein apart from chemical impurities and other carotenoids for use in cancer prevention and as a safe and effective color additive for human food. The purified lutein from marigold flowers consists of 94.79% of all E-lutein, 3.03% of its geometrical isomers (Z-lutein), and a total of 2.18% of 2',3'-anhydrolutein, zeaxanthin, alpha-cryptoxanthin and beta-cryptoxanthin.

U.S. Pat. No. 5,648,564 to Ausich et al. describes a process for forming, isolating and purifying xanthophyll crystals suitable for human consumption.

U.S. Pat. No. 6,221,417 to Sas et al. describes an in situ process for converting non-free-form xanthophylls to free xanthophylls in the biological material of the plant. The free-form xanthophylls (7.5 mg of lutein activity per kg of feed) are used to enhance the yellow color of egg yolk.

As discussed above, color is the first attribute a consumer sees of a food product. The consumer sets expectations based on their experience with the product itself, such as the yellow of egg yolks and the name given to the product, such as the creamy color with black flecks of a French vanilla ice cream. Therefore, processed foods must be colored attractively and with shades that are typical of their flavor variety. If appearance is not compatible with the expectations of the consumer, the overall appeal of the product is diminished even if the flavor is superior.

A thermally processed nutritional product's color is the result of the colors contributed by the individual ingredients as well as the numerous ingredient interactions that occur in the final product. For example, caseinates are involved in the development of color. Amino acids react with reducing sugars in the nonenzymatic browning reaction (Maillard reaction) to produce caramel-like colors and cooked flavors. Typically, the more heat a nutritional receives during processing, the more ingredient interactions occur which often produce undesirable colors, including brown and gray. The color changes from these heat-induced reactions are illustrated in FIG. 1. The nutritional mix prior to sterilization (1A) is a bright white. However, after thermal processing in a can (1B) or glass bottle (1C) the color changes. The once white mix now presents brown and gray hues. The brown and gray colors of a vanilla flavored nutritional do not closely meet the expectations of the consumer and detract from the product's appeal to the consumer.

Clearly, a brightening agent is required that can mask the brown and gray hues of thermally processed nutritional products. The brighter color would enhance the overall sensory acceptability of the product by the consumer.

SUMMARY OF THE INVENTION

In accordance with the present invention, it has been discovered that the addition of lutein compounds to the nutritional mix prior to thermal processing brightens the product and results in a more appealing color. Thermal processing of liquid and powder nutritionals typically impart brown and gray hues to the final color, which negatively impact the overall appeal of the nutritional. The inventors have discovered that the lutein compounds eliminate the gray and brown hues without imparting the relatively strong yellow color typically associated with lutein compounds. Additionally, the nutritionals possess long-term color stability.

Based on prior enhancement work done with lutein compounds in egg yolk, the inventors expected the supplemental lutein to add an undesirable yellow color to the vanilla, strawberry and chocolate flavored/colored nutritionals. This was further supported by statements from the supplier, Kemin Foods (Lutein a treat for the eyes, Food Processing's Wellness Foods, August 2001), that lutein could impact color in clear or white beverages. Surprisingly, the lutein brightened the appearance of the nutritionals by masking the typical brown and gray hues of thermally processed nutritionals without the addition of a strong yellow color. This finding was unexpected in light of the use of similar levels of lutein compounds in earlier color enhancement work done in broiler skin and egg yolk, wherein the yellow/orange of the egg yolk was enhanced by the addition of 7.5 ppm to 55 ppm of lutein compounds to poultry feed.

BRIEF DESCRIPTION OF THE FIGURES

The file of this patent contains at least one drawing executed in color. Copies of this patent with color drawing (s) will be provided by the Patent and Trademark Office upon request and payment of the necessary fee.

DETAILED DESCRIPTION

Figure 1:
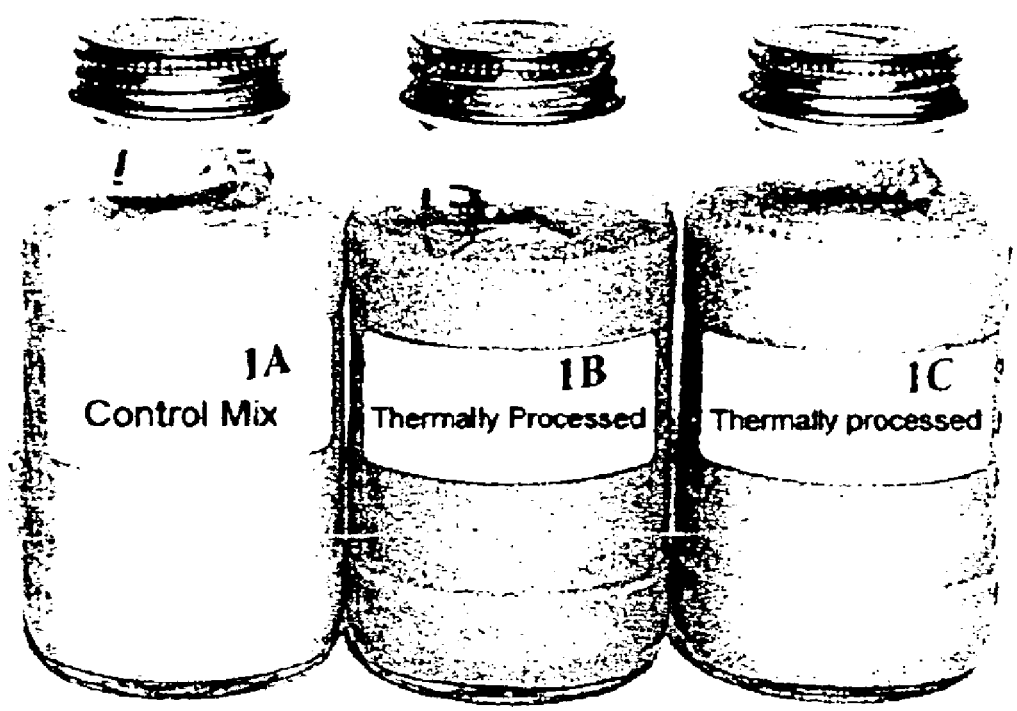
FIG. 1 is a photo of three samples: 1A) the homogenized lutein free mix prior to thermal processing; 1B) the lutein free mix thermally processed in a metal can; and 1C) the lutein free mix thermally processed in a glass bottle.

As discussed above, lutein is an oxygenated carotenoid, a xanthophyll, found in corn, green leafy vegetables and yellow-orange fruits and has the following formula (I):

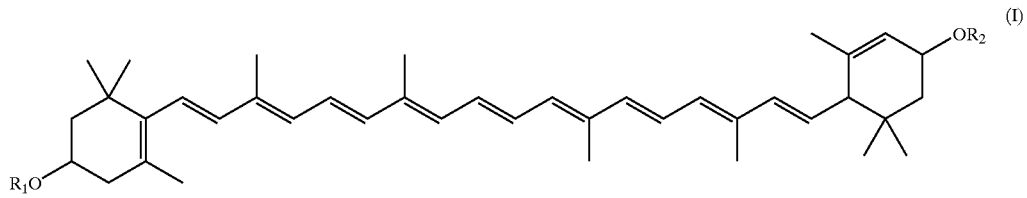

(I)

Forumula (I) describes the chemical structure of the lutein compounds referred to in the present invention. As used herein, free lutein comprises the structure of formula (I) wherein $R_1$ and $R_2$ are simultaneously H. Additionally, free lutein may be in cis and trans geometrical isomeric forms. Further, the free lutein of the invention may exist as nutritionally acceptable monovalent cation salts which include, but are not limited to lithium, sodium and potassium (see Table 1).

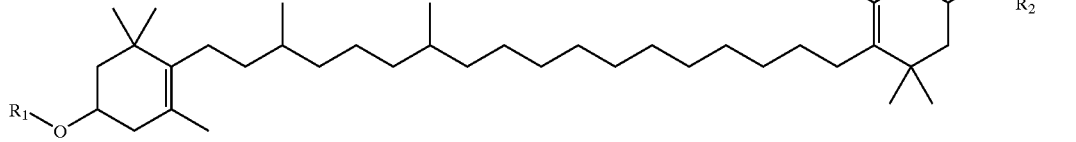

(II)

TABLE 1

Lutein Compounds

| Lutein Compound | $R_1$ | $R_2$ |
|---|---|---|
| Free Lutein | H | H |
| Lutein monoester | H | fatty carboxylic acid* |
| Lutein monoester | fatty carboxylic acid* | H |
| Lutein diester (homogenous) | fatty carboxylic acid* of $R_2$ | fatty carboxylic acid* of $R_1$ |
| Lutein diester (mixed) | A different fatty carboxylic acid* from $R_2$ | A different fatty carboxylic acid* from $R_1$ |
| Lutein salt | Monovalent salts** | Monovalent salts** |

*Saturated or unsaturated $C_1$ to $C_{22}$ fatty carboxylic acids includes, but not limited to acetic, butyric, caproic, capric, caprylic, formic, lauric, myristic, oleic, palmitic, propionic, stearic and valeric acids.
**monovalent salts include, but not limited to lithium, sodium and potassium.

As used herein, lutein ester refers to any lutein ester of formula (I) wherein $R_1$ and $R_2$ are the same or different, and are nutritionally acceptable monovalent salts, H or an acyl residue of a carboxylic acid, provided that at lest one of $R_1$ or $R_2$ is an acyl residue of a carboxylic acid. Additionally, the lutein ester may be in cis and trans geometrical isomeric forms. Further, $R_1$ and $R_2$ are the residue of a saturated or unsaturated $C_1$ to $C_{22}$ fatty carboxylic acids, which include, but are not limited to formic, acetic, propionic, butyric, valeric, caproic, caprylic, capric, lauric, myristic, palmitic, stearic, and oleic acids.

Free lutein ($C_{40}H_{56}O_2$) has a molecular weight of approximately 568 a.m.u. and lutein esters typically have molecular weights of 568 plus the molecular weight of the attached residue of a saturated or unsaturated $C_1$ to $C_{22}$ fatty carboxylic acids. For example, the molecular weight of dipalmitate lutein ester ($C_{72}H_{116}O_4$) is approximately 1044 a.m.u. It is understood in the art that 2.0 gram of lutein esters and 1.0 gram of free lutein represent the same total free lutein content. Similarly, the molecular weight of lutein salts is also increased by the molecular weight contribution of the salts. In this situation, the salt contribution is subtracted to determine the total free lutein content.

As discussed above, zeaxanthin is a stereoisomer of lutein, is typically found in combination with lutein and has the following formula (II):

Formula II describes the structure of the zeaxanthin compounds referred to in the present invention. As used herein, free zeaxanthin comprises the structure of formula (II) wherein $R_1$ and $R_2$ are simultaneously H. Additionally, free zeaxanthin may be in cis and trans geometrical isomeric forms. Further, the free zeaxanthin of the invention may exist as nutritionally acceptable monovalent cation salts which include, but are not limited to lithium, sodium and potassium (see Table 2).

TABLE 2

Zeaxanthin compounds

| Zeaxanthin Compound | $R_1$ | $R_2$ |
|---|---|---|
| Free Zeaxanthin | H | H |
| Zeaxanthin monoester | H | fatty carboxylic acid* |
| Zeaxanthin monoester | fatty carboxylic acid* | H |
| Zeaxanthin diester (homogenous) | fatty carboxylic acid* of $R_2$ | fatty carboxylic acid* of $R_1$ |
| Zeaxanthin diester (mixed) | A different fatty carboxylic acid* from $R_2$ | A different fatty carboxylic acid* from $R_1$ |
| Zeaxanthin salt | Monovalent salts** | Monovalent salts** |

*Saturated or unsaturated $C_1$ to $C_{22}$ fatty carboxylic acids includes, but not limited to acetic, butyric, caproic, capric, caprylic, formic, lauric, myristic, oleic, palmitic, propionic, stearic and valeric acids.
**monovalent salts include, but not limited to lithium, sodium and potassium.

As used herein, zeaxanthin ester refers to any zeaxanthin ester of formula (II) wherein $R_1$ and $R_2$ are the same or different and are nutritionally acceptable monovalent salts, H or an acyl residue of a carboxylic acid, provided that at least one of $R_1$ or $R_2$ is an acyl residue of a carboxylic acid. Additionally, the zeaxanthin ester may be in cis and trans geometrical isomeric forms. Further, $R_1$ and $R_2$ are the residue of a saturated or unsaturated $C_1$ to $C_{22}$ fatty carboxylic acids, which include, but are not limited to formic, acetic, propionic, butyric, valeric, caproic, caprylic, capric, lauric, myristic, palmitic, stearic, and oleic acids.

Zeaxanthin ($C_{40}H_{56}O_2$) has a molecular weight of approximately 568 a.m.u. and zeaxanthin esters typically have molecular weights of 568 plus the molecular weight of the attached residue of a saturated or unsaturated $C_1$ to $C_{22}$ fatty carboxylic acids. For example, the molecular weight of dipalmitate zeaxanthin ester ($C_{72}H_{116}O_4$) is approximately 1044 a.m.u. It is understood in the art that 2.0 gram of zeaxanthin esters and 1.0 gram of free zeaxanthin represent the same total free zeaxanthin content. Similarly, the molecular weight of zeaxanthin salts is increased by the molecular weight contribution of the salts. In this situation, the salt contribution is subtracted to determine the total free zeaxanthin content.

Brightening agents and lutein compounds are used interchangeable herein and refer to any combination of free lutein, nutritionally acceptable salts of free lutein and the cis and trans isomeric form of each; lutein esters in cis and trans isomeric forms; stereoisomers such as free zeaxanthin, nutritionally acceptable salts of zeaxanthin and the cis and trans isomeric form of each; zeaxanthin esters in cis and trans isomeric forms; along with other minor carotenoids being present as a result of the natural abundance of the source as well as those formed during the process of manufacture.

As used herein the term nutritionally acceptable salt refers to the monovalent cation salt of free lutein, lutein ester, free zeaxanthin and zeaxanthin ester, or combinations thereof. Nutritionally acceptable monovalent cation salts include, but are not limited to lithium, sodium and potassium.

As used herein the term isomeric form refers to cis isomers of free lutein, lutein esters, lutein salts, free zeaxanthin, zeaxanthin ester and zeaxanthin salts; or trans isomers of free lutein, lutein esters, lutein salts, free zeaxanthin, zeaxanthin ester and zeaxanthin salts; or a combination thereof.

Total lutein refers to the total amount of lutein and lutein equivalents within a nutritional. Typically, it is understood that 2.0 gram of zeaxanthin esters or lutein esters and 1.0 gram of free zeaxanthin or free lutein represent the same total lutein content.

Total lutein in nutritional products of the present invention may be analyzed by the methods described in Nguyen, M. L., Francis, D. M. and Schwartz, S. J., Thermal isomerization susceptibility of carotenoids in different tomato varieties. Journal of the Science of Food and Agriculture, 2001, 81, 910–917 and Emenhiser, C., Sander, L. C., and Schwartz, S. J. 1995. Capability of a polymeric $C_{30}$ stationary phase to resolve cis-trans carotenoid isomers in reversed-phase liquid chromatography. Journal Chromatography A. 707, 205–216.

Hunter Color refers to color analyzed by the Hunter ColorQuest 45/0 system spectrocolorimeter, which measures color the way the human eye sees color. The instrument is configured to measure reflectance using Hunter "Lab" scale, Illuminant C and a 2° observer. The basic principle revolves around a three-dimensional graph with axes "L", "a" and "b" all crossing at point 0.00. The "L" value measures lightness (100.00) to darkness (0.00). The "a" value measures red when the result is a positive number, gray when 0.00 and green when the result is negative. The "b" value measures yellow when the result is a positive number, gray when 0.00 and blue when the result is negative.

Nutritionals, nutritional formulas, enteral nutritionals and thermally-processed enteral nutritionals are used interchangeable herein and refer to thermally-processed liquid and powder forms of enteral formulas, oral formulas, formulas for adults, formulas for pediatric patients and formulas for infants, which may be used as a supplement to the diet or sole source of nutrition.

The present invention provides methods and compositions for brightening the color of thermally processed nutritionals by adding brightening agents to mask the typical brown and gray hues of thermally processed nutritionals.

As described earlier, free lutein, lutein esters, zeaxanthin and zeaxanthin esters for use in the present invention may be readily extracted from plant materials using known methods. The lutein compounds of the instant invention may be derived from the petals of the marigold flower, Tagetes erecta. The marigolds T. grandiflora, T. patula, and T. nana Ehrenkreutz are also suitable sources for lutein compounds. In a typical process, the marigold flowers are harvested, dried, and milled. The milled marigolds are extracted with a food grade solvent. The carotenoid fraction is then concentrated, for example, by solvent removal through vacuum distillation. Alternatively, the lutein and zeaxanthin esters may be synthesized by any means known in the art to the skilled practitioner, e.g., via esterification from free lutein and zeaxanthin.

Suitable food grade lutein/zeaxanthin and lutein/zeaxanthin esters are commercially available in different presentations such as oil soluble and water dispersible systems, spray derived emulsions, gum-based emulsions and emulsifier-based emulsions. The lutein/zeaxanthin ester of the present invention can be any mono- or diester, homogeneous or mixed. Suitable esters therefore include lutein/zeaxanthin mono- or diformate, mono- or diacetate, mono- or dipropionate, mono- or dibutyrate, mono- or divalerate, mono- or dicaproate, mono- or dicaprylate, mono- or dicaprate, mono- or dilaurate, mono- or dimyristate, mono- or dipalmitate, mono- or distearate, and mono- or dioleate, as well as mixed esters such as lutein myristate-palmitate and palmitate-stearate.

The carotenoid composition of the standard source material, marigold oleoresin, typically contains 70% trans-lutein, 20% cis-lutein, 7% zeaxanthin, 0.58% epoxides, 1.02% unsaponifiables and 1.4% others. The skilled practitioner may enrich the levels of individual xanthophyll compounds in the source material through any means known in the art, e.g., via hydrocarbon solvent extraction. Purified xanthophyll compositions useful for the instant invention typically comprise a total of cis and trans free lutein from about 10 wt/wt % to 99 wt/wt % of the xanthophyll composition; more preferably from about 40 wt/wt % to 99 wt/wt % of the xanthophyll composition; preferably from about 90 wt/wt % to 99 wt/wt % of the xanthophyll composition; and a total of cis and trans zeaxanthin from about 1 wt/wt % to 90 wt/wt % of the xanthophyll composition; more preferably from about 1 wt/wt % to 60 wt/wt % of the xanthophyll composition; preferable from about 1 wt/wt % to 10 wt/wt % of the xanthophyll composition. Similar ranges are typical of isolated xanthophyll esters or when the purified xanthophyll composition of above is esterified to form lutein and zeaxanthin esters.

Xanthophyll compounds are available commercially. For example, free lutein/zeaxanthin may be obtained in an oil suspension and beadlet form from Kemin Foods of Des Moines, Iowa distributed as FloraGLO® lutein. Lutein/zeaxanthin esters may also be obtained in an oil suspension and beadlet form. Cognis Corporation of LaGrange, Ill. distributes Xangold™ natural lutein esters in 15% oil suspension or 10% beadlets. A typical profile of Xangold™ 15% oil lutein esters contains 139,500 mcg/gm of lutein esters, 9,750 mcg/gm zeaxanthin esters and 750 mcg/gm cryptoxanthin esters. A typical profile of Xangold™ 10% beadlets contains 93,000 mcg/gm lutein esters and 7,000 mcg/gm zeaxanthin esters.

An effective amount of total lutein to brighten the reconstituted powder and liquid nutritionals of the instant invention is from about 0.2 ppm to about 60 ppm, preferably from about 0.5 ppm to about 12 ppm, more preferably from about 1 ppm to about 5 ppm.

Alternatively, an effective amount of total lutein to brighten the reconstituted powder and liquid nutritionals of the present invention is from about 0.002 wt/vol % to about 0.63 wt/vol %, preferably from about 0.005 wt/vol % to about 0.12 wt/vol %, more preferably from about 0.01 wt/vol % to about 0.055 wt/vol %.

Further, an effective amount of lutein/zeaxanthin esters to brighten reconstituted powder and liquid nutritionals are from about 0.5 ppm to about 125 ppm, preferably from about 1 ppm to about 25 ppm, more preferably from about 2 ppm to about 10 ppm.

The total lutein ranges above typically correspond to about 0.050 mg per 8 fl.oz. to about 15 mg per 8 fl.oz., preferably from about 0.125 mg per 8 fl.oz. to about 3 mg per 8 fl.oz., more preferably from about 250 mg per 8 fl.oz. to about 1.3 mg per 8 fl.oz.

Alternatively, an effective amount of lutein compounds to brighten reconstituted powder and liquid enteral nutritionals may be an amount sufficient to shift the Hunter values toward the +b axes of the three-dimensional graph. For example, "+a" values decrease toward 0.0; "−b" values increase toward 0.0; "−a" values increase toward 0.0; "+b" values increase away from 0.0 and combinations thereof.

As noted above, lutein compounds may be added to nutritional products as a brightening agent. The quantity of lutein compounds that are incorporated into the nutritional can vary widely, but will fit into the guidelines described above. The amount of lutein compounds utilized in a nutritional formula will be dependent upon various factors including the form of the nutritional and lutein/zeaxanthin compound form. The formula will preferably contain lutein compounds in an amount sufficient to provide a brighter color as measured by Hunter Color analysis.

Nutritional formulas include enteral formulas, oral formulas, formulas for adults, formulas for pediatric individuals and formulas for infants. Nutritional formulas contain a protein component, providing from 5 to 80% of the total caloric content of the formula, a carbohydrate component providing from 10 to 70% of the total caloric content, and a lipid component providing from 5 to 50% of the total caloric content. The nutritional formulas described herein may be used as a supplement to the diet or sole source of nutrition. The amount of calories and nutrients required will vary from person to person, dependent upon such variables as age, weight, and physiologic condition. The amount of nutritional formula needed to supply the appropriate amount of calories and nutrients may be determined by one of ordinary skill in the art, as may the appropriate amount of calorie and nutrients to incorporate into such formulas.

As examples, when the formula is an adult formula, the protein component may comprise from about 10 to about 80% of the total caloric content of said nutritional formula; the carbohydrate component may comprise from about 10 to about 70% of the total caloric content of said nutritional formula; and the lipid component may comprise from about 5 to about 50% of the total caloric content of said nutritional formula. The nutritional formula may be in liquid or powder form.

As another example, when the formula is a non-adult formula, the protein component may comprise from about 8 to about 25% of the total caloric content of said nutritional formula; the carbohydrate component may comprise from about 35 to about 50% of the total caloric content of said nutritional formula; and the lipid component may comprise from about 30 to about 50% of the total caloric content of said nutritional formula. These ranges are provided as examples only, and are not intended to be limiting.

The nutritional formulas will contain suitable carbohydrates, lipids and proteins as is known to those skilled in the art of making nutritional formulas. Suitable carbohydrates include, but are not limited to, hydrolyzed, intact, naturally and/or chemically modified starches sourced from corn, tapioca, rice or potato in waxy or non waxy forms; and sugars such as glucose, fructose, lactose, sucrose, maltose, high fructose corn syrup, corn syrup solids, fructooligosaccharides, and mixtures thereof.

Suitable lipids include, but are not limited to, coconut oil, soy oil, corn oil, olive oil, safflower oil, high oleic safflower oil, MCT oil (medium chain triglycerides), sunflower oil, high oleic sunflower oil, palm oil, palm olein, canola oil, cottonseed oil, fish oil, palm kernel oil, menhaden oil, soybean oil, lecithin, lipid sources of arachidonic acid and docosahexaneoic acid, and mixtures thereof. Lipid sources of arachidonic acid and docosahexaneoic acid include, but are not limited to, marine oil, egg yolk oil, and fungal or algal oil.

Numerous commercial sources for these fats are readily available and known to one practicing the art. For example, soy and canola oils are available from Archer Daniels Midland of Decatur, Ill. Corn, coconut, palm and palm kernel oils are available from Premier Edible Oils Corporation of Portland, Oreg. Fractionated coconut oil is available from Henkel Corporation of LaGrange, Ill. High oleic safflower and high oleic sunflower oils are available from SVO Specialty Products of Eastlake, Ohio. Marine oil is available from Mochida International of Tokyo, Japan. Olive oil is available from Anglia Oils of North Humberside, United Kingdom. Sunflower and cottonseed oils are available from Cargil of Minneapolis, Minn. Safflower oil is available from California Oils Corporation of Richmond, Calif.

In addition to these food grade oils, structured lipids may be incorporated into the nutritional if desired. Structured lipids are known in the art. A concise description of structured lipids can be found in INFORM, Vol. 8, no. 10, page 1004, entitled Structured lipids allow fat tailoring (October 1997). Also see U.S. Pat. No. 4,871,768, which is hereby incorporated by reference. Structured lipids are predominantly triacylglycerols containing mixtures of medium and long chain fatty acids on the same glycerol nucleus. Structured lipids and their use in enteral formula are also described in U.S. Pat. Nos. 6,194,37 and 6,160,007, the contents of which are hereby incorporated by reference.

Suitable protein sources include, but not limited to, milk, whey and whey fractions, soy, rice, meat (e.g., beef), animal and vegetable (e.g., pea, potato), egg (egg albumin), gelatin and fish. Suitable intact protein sources include, but are not limited to, soy based, milk based, casein protein, whey protein, rice protein, beef collagen, pea protein, potato protein, and mixtures thereof. Suitable protein hydrolysates include, but are not limited to, soy protein hydrolysate, casein protein hydrolysate, whey protein hydrolysate, rice protein hydrolysate, potato protein hydrolysate, fish protein hydrolysate, egg albumen hydrolysate, gelatin protein hydrolysate, a combination of animal and vegetable protein hydrolysates, and mixtures thereof.

Protein may also be provided in the form of free amino acids. The nutritional formulas may be supplemented with various amino acids in order to provide a more nutritionally complete and balanced formula. Examples of suitable free amino acids include, but are not limited to, all free L-amino acids usually considered a part of the protein system, but especially those considered essential or conditionally essential from a nutritional standpoint, namely: tryptophan, tyrosine, cyst(e)ine, methionine, arginine, leucine, valine, lysine, phenylalanine, isoleucine, threonine, and histidine. Other (non-protein) amino acids typically added to nutritional products include carnitine and taurine. In some cases, the D-forms of the amino acids are considered as nutritionally equivalent to the L-forms, and isomer mixtures are used to lower cost (for example, D,L-methionine).

The nutritional formulas preferably also contain vitamins and minerals in an amount designed to supply or supplement the daily nutritional requirements of the person receiving the formula. Those skilled in the art recognize that nutritional formulas often include overages of certain vitamins and minerals to ensure that they meet targeted level over the shelf life of the product. These same individuals also recognize that certain microingredients may have potential benefits for people depending upon any underlying illness or disease that the patient is afflicted with. For example, diabetics benefit from such nutrients as chromium, carnitine, taurine and vitamin E. Formulas preferably include, but are not limited to, the following vitamins and minerals: calcium, phosphorus, sodium, chloride, magnesium, manganese, iron, copper, zinc, selenium, iodine, chromium, molybdenum, conditionally essential nutrients m-inositol, carnitine and taurine, and Vitamins A, C, D, E, K and the B complex, and mixtures thereof.

If the nutritional is intended for an infant, then specific nutritional guidelines may be found in the Infant Formula Act, 21 U.S.C. section 350(a). The nutritional guidelines found in these statutes continue to be refined as further research concerning nutritional requirements is completed. The nutritional formulas claimed are intended to encompass formulas containing vitamins and minerals that may not currently be listed.

The nutritional formulas also may contain fiber and stabilizers. Suitable sources of fiber/and or stabilizers include, but are not limited to, xanthan gum, guar gum, gum arabic, gum ghatti, gum karaya, gum tracacanth, agar, furcellaran, gellan gum, locust bean gum, pectin, low and high methoxy pectin, oat and barley glucans, carrageenans, psyllium, gelatin, microcrystalline cellulose, CMC (sodium carboxymethylcellulose), methylcellulose hydroxypropyl methyl cellulose, hydroxypropyl cellulose, DATEM (diacetyl tartaric acid esters of mono- and diglycerides), dextran, carrageenans, FOS (fructooligosaccharides), and mixtures thereof. Numerous commercial sources of soluble dietary fibers are available. For example, gum arabic, hydrolyzed carboxymethylcellulose, guar gum, pectin and the low and high methoxy pectins are available from TIC Gums, Inc. of Belcamp, Md. The oat and barley glucans are available from Mountain Lake Specialty Ingredients, Inc. of Omaha, Nebr. Psyllium is available from the Meer Corporation of North Bergen, N.J. while the carrageenan is available from FMC Corporation of Philadelphia, Pa.

The fiber incorporated may also be an insoluble dietary fiber representative examples of which include oat hull fiber, pea hull fiber, soy hull fiber, soy cotyledon fiber, sugar beet fiber, cellulose and corn bran. Numerous sources for the insoluble dietary fibers are also available. For example, the corn bran is available from Quaker Oats of Chicago, Ill.; oat hull fiber from Canadian Harvest of Cambridge, Minn.; pea hull fiber from Woodstone Foods of Winnipeg, Canada; soy hull fiber and oat hull fiber from The Fibrad Group of LaVale, Md.; soy cotyledon fiber from Protein Technologies International of St. Louis, Mo.; sugar beet fiber from Delta Fiber Foods of Minneapolis, Minn. and cellulose from the James River Corp. of Saddle Brook, N.J.

A more detailed discussion of examples of fibers and their incorporation into formula may be found in U.S. Pat. No. 5,085,883 issued to Garleb et al, which is hereby incorporated by reference.

The quantity of fiber utilized in the formulas can vary. The particular type of fiber that is utilized is not critical. Any fiber suitable for human consumption and that is stable in the matrix of a nutritional formula may be utilized.

In addition to fiber, the nutritionals may also contain oligosaccharides such as fructooligosaccharides (FOS) or glucooligosaccharides (GOS). Oligosaccharides are rapidly and extensively fermented to short chain fatty acids by anaerobic microorganisms that inhabit the large bowel. These oligosaccharides are preferential energy sources for most Bifidobacterium species, but are not utilized by potentially pathogenic organisms such as *Clostridium perfingens, C. difficile,* or *Eschericia coli.*

The nutritional formulas may also contain a flavor to enhance its palatability. Useful flavorings include, but are not limited to, chocolate, vanilla, coffee, peach, butter pecan, blueberry, banana, cherry, orange, grape, fruit punch, bubble gum, apple, raspberry and strawberry. Artificial sweeteners may be added to complement the flavor and mask salty taste. Useful artificial sweeteners include saccharin, nutrasweet, sucralose, acesulfane-K (ace-K), etc..

Nutritional formulas can be manufactured using techniques well known to those skilled in the art. Various processing techniques exist. Typically these techniques include formation of a slurry from one or more solutions which may contain water and one or more of the following: carbohydrates, proteins, lipids, stabilizers, vitamins and minerals. The slurry is emulsified, homogenized and cooled. Various other solutions may be added to the slurry before processing, after processing or at both times. The processed formula is then sterilized and may be diluted to be dried to a powder, utilized on a ready-to-feed basis or packaged in a concentrated liquid form. When the resulting formula is meant to be a ready-to-feed liquid or concentrated liquid, an appropriate amount of water would be added before sterilization.

EXAMPLE I

Table 3 presents a bill of materials for manufacturing 1,000 kg of a typical vanilla flavored liquid nutritional product containing the brightening agent lutein. A detailed description of its manufacture follows.

TABLE 3

Bill of Materials for Vanilla Liquid Nutritional with Lutein

| Ingredient | Quantity per 1,000 kg |
|---|---|
| Water | QS |
| Corn Syrup | 33 kg |
| Maltodextrin | 28 kg |

TABLE 3-continued

Bill of Materials for Vanilla Liquid Nutritional with Lutein

| Ingredient | Quantity per 1,000 kg |
|---|---|
| Sucrose | 19.4 kg |
| Caseinate | 8.7 kg |
| High Oleic Safflower Oil | 4.1 kg |
| Canola Oil | 4.1 kg |
| Soy Protein | 3.7 kg |
| Whey Protein | 3.2 kg |
| Caseinate | 2.9 kg |
| Corn Oil | 2.0 kg |
| Tricalcium Phosphate | 1.4 kg |
| Potassium Citrate | 1.3 kg |
| Magnesium Phosphate | 952 gm |
| Lecithin | 658 gm |
| Magnesium chloride | 558 gm |
| Vanilla Flavor | 544 gm |
| Sodium Chloride | 272 gm |
| Carrageenan | 227 gm |
| Choline chloride | 218 gm |
| UTM/TM Premix | 165 gm |
| Potassium Chloride | 146 gm |
| Ascorbic Acid | 145 gm |
| Sodium Citrate | 119 gm |
| Potassium Hydroxide | 104 gm |
| Lutein (5%) | 46 gm |
| WSV Premix | 33 gm |
| Vit DEK Premix | 29 gm |
| Vitamin A | 3.7 gm |
| Potassium Iodide | 86 mcg |

WSV premix (per g premix): 375 mg/g niacinamide, 242 mg/g calcium pantothenate, 8.4 gm/g folic acid, 62 mg/g thiamine chloride hydrochloride, 48.4 gm/g riboflavin, 59.6 mg/g pyridoxine hydrochloride, 165 mcg/g cyanocobalamin and 7305 mcg/g biotin
Vitamin DEK premix (per g premix): 8130 IU/g vitamin $D_3$, 838 IU/g vitamin E, 1.42 mg/g vitamin $K_1$
UTM/TM premix (per g premix): 45.6 mg/g zinc, 54 mg/g iron, 15.7 manganese, 6.39 mg/g copper, 222 mcg/g selenium, 301 mcg/g chromium and 480 mcg/g molybdenum The liquid nutritional products of the present invention are manufactured by preparing three slurries that are blended together, heat treated, standardized, packaged and sterilized.

A carbohydrate/mineral slurry is prepared by first heating the required amount of water to a temperature of from about 65° C. to about 71° C. with agitation. With agitation, the required amount of potassium citrate and ultra trace mineral/trace mineral (UTM/TM) premix (distributed by Fortitech, Schnectady, N.Y.) is added. The slurry is greenish yellow in color. Agitation is maintained until the minerals are completely dispersed. With agitation, the required amounts of the following minerals are then added: magnesium chloride, potassium chloride, sodium chloride, sodium citrate, potassium iodide, magnesium phosphate and tricalcium phosphate. Next, the maltodextrin distributed by Grain Processing Corporation, Muscataine, Iowa, U.S.A., sucrose and corn syrup are added to slurry under high agitation, and are allowed to dissolve. The completed carbohydrate/mineral slurry is held with agitation at a temperature from about 65° C. to about 71° C. for not longer than eight hours until it is blended with the other slurries.

A protein in fat slurry (PIF) is prepared by combining and heating the required amounts of high oleic safflower oil and canola oil to a temperature from about 40.5° C. to about 49° C. with agitation. With agitation, the required amounts of free lutein from Kemin Foods of Des Moines, Iowa is added. Agitate for a minimum of 15 minutes. Add the following ingredients are added to the heated oil: lecithin (distributed by Central Soya Company, Fort Wayne, Ind.), vitamin A, and Vitamin D, E, K premix (distributed by Vitamins Inc., Chicago, Ill.). The required amount of carrageenan is dry blended with the required amount of whey protein and add to the agitating lipid mixture and allowed to agitate for a minimum of 10 minutes. The required amount of soy protein is added to the blend slowly to assure proper mixing. The completed oil/protein slurry is held under moderate agitation at a temperature from about 40° C. to about 43° C. for a period of no longer than two hours until it is blended with the other slurries.

A protein in water slurry is prepared by first heating about required amount of water to a temperature of about 40° C. with agitation. The caseinate is added and the slurry is agitated well until the caseinate is completely dispersed. With continued agitation, the slurry is slowly warmed to 60° C. to 65° C. The slurry is held for no longer than twelve hours until it is blended with the other slurries.

The batch is assembled by blending required amount of protein slurry with required amount of the carbohydrate/mineral slurry and allowed to agitate for 10 minutes. With agitation, the required amount of the oil/protein slurry is added and agitate for at least 10 minutes. The pH of the blended batch is adjusted to a pH of 6.66 to 6.75 with 1N potassium hydroxide.

After waiting for a period of not less than one minute nor greater than two hours, the blend slurry is subjected to deaeration, ultra-high-temperature treatment, and homogenization. The blended slurry is heated to a temperature from about 71° C. to about 82° C. and deareated under vacuum. The heated slurry is then emulsified through a single stage homogenizer at 900 to 1100 psig. After emulsification, the slurry is heated from about 99° C. to about 110° C. and then heated to a temperature of about 146° C. for about 5 seconds. The slurry is passed through a flash cooler to reduce the temperature to from about 99° C. to about 110° C. and then through a plate cooler to reduce the temperature to from about 71° C. to about 76° C. The slurry is then homogenized at 3900 to 4100/400 to 600 psig. The slurry is held at about 74° C. to about 80° C. for 16 seconds and then cooled to 1° C. to about 7° C. At this point, samples are taken for microbiological and analytical testing. The mixture is held under agitation.

A water soluble vitamin (WSV) solution is prepared separately and added to the processed blended slurry.

The vitamin solution is prepared by adding the following ingredients to 9.4 kg of water with agitation: WSV premix (distributed by J. B. Laboratories, Holland, Mich.), vitamin C, choline chloride, L-carnitine, taurine, inositiol, folic acid, pyridoxine hydrochloride and cyanocobalamin. The required amount of 45% potassium hydroxide slurry is added to bring the pH to between 7 and 10.

Based on the analytical results of the quality control tests, an appropriate amount of water is added to the batch with agitation to achieve the desired total solids. Additionally, 8.8 kg of vitamin solution is added to the diluted batch under agitation.

The product pH may be adjusted to achieve optimal product stability. The completed product is then placed in suitable containers and subjected to terminal sterilization.

EXAMPLE II

Table 4 presents a bill of materials for manufacturing 1,000 kg of a liquid nutritional product, which provides nutrients to a person with abnormal glucose, containing the brightening agent lutein. A detailed description of its manufacture follows.

TABLE 4

Bill of Materials for Diabetic Liquid Nutritional with Lutein

| Ingredient | Quantity per 1,000 kg |
| --- | --- |
| Water | QS |
| Maltodextrin | 56 kg |
| Acidic casein | 41.093 kg |
| Fructose | 28 kg |
| High oleic safflower oil | 27.2 kg |
| Maltitol syrup | 16 kg |
| Maltitol | 12.632 kg |
| Fibersol ® 2(E) | 8.421 kg |
| Caseinate | 6.043 kg |
| Fructooligosaccharide | 4.607 kg |
| Soy polysaccharide | 4.3 kg |
| Canola oil | 3.2 kg |
| Tricalcium phosphate | 2.8 kg |
| Magnesium chloride | 2.4 kg |
| Lecithin | 1.6 kg |
| Sodium citrate | 1.18 kg |
| Potassium citrate | 1.146 kg |
| Sodium hydroxide | 1.134 kg |
| Magnesium phosphate | 1.028 kg |
| m-inositol | 914.5 gm |
| Vitamin C | 584 gm |
| Potassium chloride | 530 gm |
| Choline chloride | 472.1 gm |
| 45% Potassium hydroxide | 402.5 gm |
| UTM/TM premix | 369.3 gm |
| Potassium phosphate | 333 gm |
| Carnitine | 230.5 gm |
| Gellan gum | 125 gm |
| Ttaurine | 100.1 gm |
| Vitamin E | 99 gm |
| Lutein Esters (5%) | 92 gm |
| WSV premix | 75.4 gm |
| Vitamin DEK premix | 65.34 gm |
| 30% Beta carotene | 8.9 gm |
| Vitamin A | 8.04 gm |
| Pyridoxine hydrochloride | 3.7 gm |
| Chromium chloride | 1.22 gm |
| Folic acid | 0.64 gm |
| Potassium iodide | 0.20 gm |
| Cyanocobalamin | 0.013 gm |

WSV premix (per g premix): 375 mg/g niacinamide, 242 mg/g calcium pantothenate, 8.4 gm/g folic acid, 62 mg/g thiamine chloride hydrochloride, 48.4 gm/g riboflavin, 59.6 mg/g pyridoxine hydrochloride, 165 mcg/g cyanocobalamin and 7305 mcg/g biotin
Vitamin DEK premix (per g premix): 8130 IU/g vitamin $D_3$, 838 IU/g vitamin E, 1.42 mg/g vitamin $K_1$
UTM/TM premix (per g premix): 45.6 mg/g zinc, 54 mg/g iron, 15.7 mg/g manganese, 6.39 mg/g copper, 222 mcg/g selenium, 301 mcg/g chromium and 480 mcg/g molybdenum The diabetic liquid nutritional products of the present invention are manufactured by preparing four slurries that are blended together, heat treated, standardized, packaged and sterilized.

A carbohydrate/mineral slurry is prepared by first heating about 82 kg of water to a temperature of from about 65° C. to about 71° C. with agitation. With agitation, the required amount of sodium citrate and gellen gum distributed by the Kelco, Division of Merck and Company Incorporated, San Diego, Calif., U.S.A. is added and agitated for 5 minutes. The required amount of the ultra trace mineral/trace mineral (UTM/TM) premix (distributed by Fortitech, Schnectady, N.Y.) is added. The slurry is greenish yellow in color. Agitation is maintained until the minerals are completely dispersed. With agitation, the required amounts of the following minerals are then added: potassium citrate, potassium chloride, chromium chloride, magnesium chloride and potassium iodide. Next, the first maltodextrin distributed by Grain Processing Corporation, Muscataine, Iowa, U.S.A. and fructose are added to slurry under high agitation, and are allowed to dissolve. With agitation, the required amounts of maltitol powder distributed by Roquette America, Inc., Keokuk, Iowa, maltitol syrup distributed by AlGroup Lonza, Fair Lawn, N.J., fructooligosaccharides distributed by Golden Technologies Company, Golden, Colo., U.S.A. and a second maltodextrin distributed by Matsutani Chemical Industry Co., Hyogo, Japan under the product name Fibersol 2(E) are added and agitated well until completely dissolved. The required amount of tricalcium phosphate and magnesium phosphate are added to the slurry under agitation. The completed carbohydrate/mineral slurry is held with agitation at a temperature from about 65° C. to about 71° C. for not longer than twelve hours until it is blended with the other slurries.

A fiber in oil slurry is prepared by combining and heating the required amounts of high oleic safflower oil and canola oil to a temperature from about 40.5° C. to about 49° C. with agitation. With agitation, the required amounts of lutein esters from Cognis of LaGrange, Ill. is added. Agitate for a minimum of 15 minutes. With agitation, the required amounts of the following ingredients are added to the heated oil: lecithin (distributed by Central Soya Company, Fort Wayne, Ind.), Vitamin D, E, K premix (distributed by Vitamins Inc., Chicago, Ill.), vitamin A, vitamin E and beta-carotene. The required amounts of soy polysaccharide distributed by Protein Technology International, St. Louis, Mo. is slowly dispersed into the heated oil. The completed oil/fiber slurry is held under moderate agitation at a temperature from about 55° C. to about 65° C. for a period of no longer than twelve hours until it is blended with the other slurries.

A first protein in water slurry is prepared by heating 293 kg of water to 60° C. to 65° C. With agitation, the required amount of 20% potassium citrate solution is added and held for one minute. The required amount of acid casein is added under high agitation followed immediately by the required amount of 20% sodium hydroxide. The agitation is maintained at high until the casein is dissolved. The slurry is held from about 60° C. to 65° C. with moderate agitation.

A second protein in water slurry is prepared by first heating about 77 kg of water to a temperature of about 40° C. with agitation. The caseinate is added and the slurry is agitated well until the caseinate is completely dispersed. With continued agitation, the slurry is slowly warmed to 60° C. to 65° C. The slurry is held for no longer than twelve hours until it is blended with the other slurries.

The batch is assembled by blending 344 kg of protein slurry one with 84 kg of protein slurry two. With agitation, the 37 kg of the oil/fiber slurry is added. After waiting for at least one minute, 216 kg of the carbohydrate/mineral slurry is added to the blended slurry from the preceding step with agitation and the resultant blended slurry is maintained at a temperature from about 55° C. to about 60° C. The pH of the blended batch is adjusted to a pH of 6.45 to 6.75 with 1N potassium hydroxide.

After waiting for a period of not less than one minute nor greater than two hours, the blend slurry is subjected to deaeration, ultra-high-temperature treatment, and homogenization. The blended slurry is heated to a temperature from about 71° C. to about 82° C. and deaerated under vacuum. The heated slurry is then emulsified through a single stage homogenizer at 900 to 1100 psig. After emulsification, the slurry is heated from about 99° C. to about 110° C. and then heated to a temperature of about 146° C. for about 5 seconds. The slurry is passed through a flash cooler to reduce the temperature to from about 99° C. to about 110° C. and then through a plate cooler to reduce the temperature to from about 71° C. to about 76° C. The slurry is then homogenized at 3900 to 4100/400 to 600 psig. The slurry is held at about 74° C. to about 80° C. for 16 seconds and then cooled to 1° C. to about 7° C. At this point, samples are taken for microbiological and analytical testing. The mixture is held under agitation.

A water soluble vitamin (WSV) solution is prepared separately and added to the processed blended slurry.

The vitamin solution is prepared by adding the following ingredients to 9.4 kg of water with agitation: WSV premix (distributed by J. B. Laboratories, Holland, Mich.), vitamin C, choline chloride, L-carnitine, taurine, inositiol, folic acid, pyridoxine hydrochloride and cyanocobalamin. The required amount of 45% potassium hydroxide slurry is added to bring the pH to between 7 and 10.

Based on the analytical results of the quality control tests, an appropriate amount of water is added to the batch with agitation to achieve desired total solids. Additionally, 8.8 kg of vitamin solution is added to the diluted batch under agitation.

The product pH may be adjusted to achieve optimal product stability. The completed product is then placed in suitable containers and subjected to terminal sterilization.

EXAMPLE III

The following Example illustrates the preparation of a ready-to-feed infant formula containing the brightening agent lutein. The components utilized in the formula are depicted Table 5. The quantities outlined are used to prepare a 7711 kg batch of formula.

TABLE 5

Bill of Materials for ready-to-feed infant formula with Lutein

| INGREDIENT | Quantity per 7711 kg |
| --- | --- |
| High oleic safflower oil | 120.2 kg |
| Coconut oil | 85.7 kg |
| Soy oil | 80.3 kg |
| Lecithin | 2.92 kg |
| Mono-and diglyceride | 2.92 kg |
| Oil soluble vitamin premix | 0.365 kg |
| β-carotene | 0.0137 kg |
| Carrageenan | 1.43 kg |
| Whey Protein | 61.2 kg |
| Lactose | 476.3 kg |
| Potassium citrate | 4.6 kg |
| Magnesium chloride | 0.735 kg |
| Condensed skim milk | 821 kg |
| Calcium carbonate | 3.36 kg |
| Ferrous sulfate | 0.450 kg |
| Lutein (20%) | 11.5 kg |
| Water Soluble Vitamin Premix Trace Minerals/Taurine | 1.11 kg |
| Choline chloride | 0.600 kg |
| Adenosine 5'monophosphate | 0.113 kg |
| Guanosine 5'monophosphate-Na2 | 0.197 kg |
| Cytidine 5'monophosphate | 0.259 kg |
| Uridine 5'monophosphate-Na2 | 0.216 kg |
| Ascorbic acid | 1.78 kg |
| 45% KOH | 2.36 kg |

The first step in the preparation of formulas is the preparation of the oil blend. To an appropriately sized blend tank with agitation and heating soy oil, coconut oil and high oleic safflower oil were added. The mixture is heated to 40.5° C. to 49° C. with agitation. With agitation, the required amounts of free lutein from Roche of Nutley, N.J. is added. Agitate for a minimum of 15 minutes. The lecithin and mono-and diglycerides are added to the blend tank with agitation. The oil soluble vitamin premix is added with agitation. The premix container was rinsed with the oil blend and transferred back to the blend tank to ensure complete delivery of the vitamin premix. The β-carotene is added to the oil blend and the mixture agitated until the components are well dispersed. The β-carotene container is rinsed with the oil blend and the contents returned to the blend tank to ensure complete delivery of the p-carotene solution. Lastly, the carrageenan is added to the oil blend and the mixture is agitated and held at 54.0–60° C. until used.

The carbohydrate, mineral and condensed skim milk (CSM) protein slurry is prepared next. To water heated to 68–73° C. the lactose is added and the mixture agitated until the lactose is well dissolved. Potassium citrate is then added followed by potassium chloride, sodium chloride and magnesium chloride. The condensed skim milk (CSM) and tri-calcium phosphate are then added and the mixture is agitated and held at 54–60° C. until used.

The protein-in-water (PIW) slurry is then prepared. The whey protein is added to water at 54–60° C. under mild agitation. The PIW slurry is held under mild agitation until needed. Also contemplated in this invention is the use of protein-in-fat (PIF) slurries, wherein an appropriate amount of protein is admixed with all or a portion of the oil (fat) component.

The PIW slurry is then added to the prepared oil blend. The required amount of the carbohydrate, mineral and CSM slurry is then added to the oil blend. The pH of the mixture is then determined and if below specification, it is adjusted using KOH to a pH of 6.75 to 6.85. The mixture is then held at 54–60° C. under agitation for at least 15 minutes.

The mixture is then heated to 68–74° C. and deaerated under vacuum. The mixture is then emulsified through a single stage homogenizer at 6.21 to 7.58 MPa. After emulsification, the mixture is heated to 120–122° C. for 10 seconds and then 149–150° C. for 5 seconds. The mixture is then passed through a flash cooler to reduce the temperature to 120–122° C. and then through a plate cooler to reduce the temperature to 71–79° C. The mixture is then passed through a two stage homogenizer at 26.89 to 28.27 MPa and 2.76 to 4.14 MPa. The mixture is held at 73 to 83° C. for 16 seconds and then cooled to 1 to 7° C. At this point, samples are taken for microbiological and analytical testing. The mixture is held under agitation.

A calcium carbonate solution may be prepared for use in adjusting the calcium level of the mixture if outside of specification.

A vitamin stock solution is prepared. To water heated at 37 to 66° C. is added potassium citrate and ferrous sulfate. The vitamin premix is then added and the mixture agitated. The choline chloride is added and then the required amount of this vitamin mixture is added to the batch.

The nucleotide solution is then prepared. The following nucleotides are added to water with mild agitation in the following order: AMP, GMP, CMP, UMP. Agitation is continued for about 10 minutes to dissolve the nucleotides. The nucleotide solution is then added to the batch.

Lastly, an ascorbic acid solution is prepared and added slowly to the batch with agitation for at least 10 minutes. Final dilution with water to meet specified levels of solids and caloric density is completed. The batch is then packaged in suitable containers and sterilized using conventional technology.

EXAMPLE IV

Table 6 presents a bill of materials for manufacturing 454 kg of a vanilla flavored soy-based powder nutritional product containing the brightening agent lutein. A detailed description of its manufacture follows.

TABLE 6

Bill of Materials for Soy-Based Powder Vanilla Flavored Product with Lutein

| Ingredient Name | Quantity per 454 kg |
|---|---|
| Corn syrup | 99.6 kg |
| Sucrose | 122 kg |
| Soy protein | 117.6 kg |
| Maltodextrin | 66.6 kg |
| High oleic safflower oil | 8.2 kg |
| Canola oil | 8.2 kg |
| Potassium citrate | 3.5 kg |
| Magnesium phosphate | 5.0 kg |
| Vanilla flavor | 4.6 kg |
| Corn oil | 4.1 kg |
| Choline chloride | 0.99 kg |
| Sodium citrate | 3.5 kg |
| UTM/TM premix* | 0.7 kg |
| Ascorbic acid | 0.65 kg |
| Mixed tocopherols | 22.7 gm |
| Vitamin DEK premix** | 0.19 kg |
| Lutein esters (5%) | 92 gm |
| WSV premix^ | 0.12 kg |
| Vitamin A palmitate^^ | 72.6 gm |
| Potassium iodide | 458.5 mg |

*The ultratrace mineral/trace mineral (UTM/TM) premix provides 88 gm zinc sulfate (0.194077 lbs.), 114 gm encapsulated ferrous sulfate (0.251651 lbs.), 32 gm manganese sulfate (0.071775 lbs.), 17 gm cupric sulfate (0.037023 lbs.), 1 gm chromium chloride (0.002380 lbs.), 1 gm sodium molybdate (0.002380 lbs), 387 mcg sodium selenate (0.000854 lbs.) to the product.
**The vitamin D, E, K premix provides 27 mcg vitamin D (0.000061 lbs.), 127 gm vitamin E (0.279874 lbs.), and 212 mcg vitamin K (0.000468 lbs) to the product.
^The water soluble vitamin (WSV) premix provides 47 gm niacinamide (0.103155 lbs.), 30 gm d-calcium pantothenate (0.066724 lbs.), 1 gm folic acid (0.002311 lbs.), 8 gm thiamine chloride HCl (0.017030 lbs.), 6 gm riboflavin (0.013309 lbs.), 7 gm pyroxidine HCl (0.016392 lbs.), 20 mcg cyanocobalamin (0.000046 lbs.) and 911 mcg biotin (0.002008 lbs.) to the product.
^^Vitamin A palmitate premix provides 4 gm vitamin A palmitate (0.008608 lbs.) to the product.

The powder nutritional products of the present invention are manufactured by preparing three slurries that are blended together, heat treated, standardized, spray dried and packaged. The process for manufacturing 454 kg of a spray dried powder nutritional product, using the bill of materials from Table 4, is described in detail below.

A 45% to about 55% total solids carbohydrate/mineral slurry is prepared by heating the required amount of water to about 63° C. to about 66° C. The following minerals are added in the order listed, under high agitation: potassium citrate, sodium citrate, and UTM/TM premix (distributed by Fortitech, Inc., Schenectady, N.Y.). The slurry is held under agitation for a minimum of 5 minutes. The remaining minerals are added in the order listed under high agitation: potassium iodide, and magnesium phosphate. The corn syrup is added under high agitation and allowed to dissolve. Next, the maltodextrin (distributed by Grain Processing Corporation, Muscataine, Iowa) is added to slurry under high agitation, and is allowed to dissolve. The sugar (sucrose) is then added under high agitation and allowed to dissolve. The completed carbohydrate/mineral slurry is held with high agitation at a temperature from about 60° C. to about 65° C. for not longer than twelve hours until it is blended with the other slurries.

The oil slurry is prepared by combining and heating the high oleic safflower oil, corn and canola oil. The mixture is heated to 40.5° C. to 49° C. with agitation. With agitation, the required amounts of lutein esters from Quest of Owings Mills, Md. is added. Agitate for a minimum of 15 minutes. The Vitamin D,E,K premix (distributed by Vitamins, Inc., Chicago, Ill.), Vitamin A Palmitate and mixed tocopherols (distributed by Eastman Chemical Company, Kingsport, Tenn.) are then added to the slurry with agitation. The completed oil slurry is held under moderate agitation at a temperature from about 54° C. to about 60° C. for a period of no longer than twelve hours until it was blended with the other slurries.

A 18% to about 22% total solids protein-in-water slurry is prepared by first dispersing the soy protein (distributed by Protein Technologies International, St. Louis, Mo.) in the required amount of water under high agitation. The completed protein-in-water slurry is held under moderate agitation at a temperature from about 63° C. to about 68° C. for a period of no longer than two hours until it is blended with the other slurries.

The protein-in-water and oil slurries are blended together with agitation and the resultant blend is maintained at a temperature from about 60° C. to about 65° C. After waiting for at least five minutes, the carbohydrate/mineral slurry is added to the blend from the preceding step with agitation and the resultant blend is maintained at a temperature from about 60° C. to about 65° C. The total solids of the final blend is about 40% to about 44%. The blend pH is brought up to about 6.8 to about 7.0 with 1N KOH.

After waiting for a period of not less than one minute nor greater than two hours, the blend slurry is subjected to deaeration, HTST treatment, and homogenization. The blended slurry is heated to a temperature from about 68° C. to about 74° C. and deareated under vacuum. The heated slurry is then emulsified at 900 to 1100 psig. After emulsification, the slurry is heated from about 71° C. to about 77° C. for about 16 seconds. The slurry is then homogenized at 3900 to 4100/400 to 600 psig. The slurry is then cooled to about 34° C. to about 45° C. At this point, samples are taken for microbiological and analytical testing. The mixture is held under agitation.

A vitamin solution and a flavor solution are prepared separately and added to the processed blend.

The vitamin solution is prepared by adding the following ingredients to the required amount of water, under agitation: Ascorbic Acid, Water Soluble Vitamin Premix (distributed by Fortitech, Inc., Schenectady, N.Y.) and Choline Chloride. The vitamin solution pH is adjusted to from about 6 to about 10 with 45% KOH. The vitamin slurry is then added to the blended slurry under agitation.

The flavor solution is prepared by adding the natural and artificial flavor to a minimal amount of water with agitation. The flavor slurry is then added to the blended slurry under agitation.

The total solids of the final standardized product is 40%. The product is preheated to 74° C. and homogenized at about 2500/500 psig before spray drying. A pilot scale high pressure nozzle tower spray drier (distributed by NIRO Hudson Inc., Hudson, Wis.) is used to dry the product. Drying conditions are an inlet temperature of 193° C. with an outlet temperature of 103° C. and nozzle #24 is used. The resulting powder is packaged under nitrogen to maximize product stability and flavor.

EXAMPLE V

Table 7 presents a bill of materials for manufacturing 771 kg of a pediatric enteral nutritional containing the brightening agent lutein of the instant invention. A detailed description of its manufacture follows.

TABLE 7

Bill of materials for vanilla pediatric nutritional

| Ingredient | Quantity per 771 kg |
|---|---|
| Stock PIF Slurry | |
| High oleic safflower oil | 40.7 kg |
| Soy oil | 24.4 kg |
| MCT oil | 16.3 kg |
| Lecithin | 840.2 g |
| Monoglycerides | 840.2 g |
| Carrageenan | 508.9 g |
| Caseinate | 32.8 kg |
| Stock OSV blend | |
| DEK premix | 83.3 g |
| Vitamin A | 7.1 g |
| Lutein esters (5%) | 92 g |
| Stock PIW slurry | |
| Water | 530 kg |
| Caseinate | 11.3 kg |
| Whey protein | 11.9 kg |
| Stock MIN slurry | |
| Water | 18 kg |
| Cellulose gum | 1696 g |
| Magnesium chloride | 2.7 kg |
| Potassium chloride | 1.0 kg |
| Potassium citrate | 2.7 kg |
| Potassium iodide | 0.25 g |
| Dipotassium phosphate | 1.45 kg |
| Final blend | |
| PIW slurry | 251 kg |
| PIF slurry | 53 kg |
| MIN slurry | 12.6 kg |
| Sodium chloride | 127.4 g |
| Sucrose | 77.6 kg |
| Tricalcium phosphate | 2.5 kg |
| Water | 167 kg |
| Stock WSV solution | |
| Water | 31.7 kg |
| Potassium citrate | 3.74 kg |
| UTM/TM premix | 172.2 g |
| WSV remix | 134.1 g |
| m-inositol | 176.7 g |
| Ttaurine | 145.5 g |
| L-carnitine | 34.92 g |
| Choline chloride | 638.7 g |
| Stock ascorbic acid solution | |
| Water | 18.6 kg |
| Ascorbic acid | 550.0 g |
| 45% KOH | 341 g |
| Stock vanilla solution | |
| Water | 38.5 kg |
| Vanilla flavor | 4.3 kg |

DEK premix: (per gm premix) 12,100 IU vitamin $D_3$, 523 IU vitamin E, 0.962 mg vitamin $K_1$
UTM/TM premix: (per gm premix) 132 mg zinc, 147 mg iron, 10.8 mg manganese, 12.5 mg copper, 0.328 mg selenium, 0.284 mg molybdenum
WSV premix: (per gm premix) 375 mg niacinamide, 242 mg d-calcium pantothenate, 8.4 mg folic acid, 62 mg thiamine chloride hydrochloride, 48.4 mg riboflavin, 59.6 mg pyridoxine hydrochloride, 165.5 mcg cyanocobalamin, 7305 mcg biotin The stock oil soluble vitamin blend (OSV blend) is prepared by weighing out the specified amount of DEK premix into a screw cap, light protected container large enough to hold 54 g of oil soluble vitamins. Using a plastic pipette, the required amount of vitamin A is added to the DEK aliquot. The container is flushed with nitrogen prior to applying the lid.

The stock protein in fat slurry (PIF) was prepared by adding the required amounts of high oleic safflower oil, soy oil and MCT oil to the blend tank. The mixture is heated to 40.5° C. to 49° C. with agitation. With agitation, the required amounts of lutein esters from American River Nutrition of Hadley, Mass. is added. Agitate for a minimum of 15 minutes. The emulsifiers, lecithin (distributed by Central Soya of Decatur, Ind.) and monoglycerides (distributed by Quest of Owings Mills, Md.), are added and mixed well to dissolve. All of the OSV blend is then added. The containers are rinsed out 4 to 5 times with the oil blend to assure complete transfer of the vitamins. The carrageenan (distributed by FMC of Rockland, Me.) and the caseinate are added. The slurry is mixed well to disperse the protein. The PIF slurry is held up to six hours at 60–65° C. under moderate agitation until used.

The stock protein in water slurry (PIW) is prepared by adding the required amount of water to a blend tank. The water is held under moderate agitation and brought up to 76–82° C. The required amount of caseinate is added to the water under high agitation and mixed on high until the protein is fully dispersed. The protein slurry is allowed to cool to 54–60° C. before proceeding. Once cooled the required amount of whey protein is added and mixed well until fully dispersed/dissolved. The PIW slurry is held up to two hours at 54–60° C. until used.

The stock mineral solution (MIN) is prepared by adding the required amount of water to a blend tank and heated to 60–68° C. The cellulose gum blend (distributed by FMC of Newark, Del.) is added to the water and held under moderate agitation for a minimum of five minutes before proceeding. The mineral salts magnesium chloride, potassium chloride, potassium citrate, potassium iodide and dipotassium phosphate are added one at a time with mixing between each addition to ensure the minerals dissolved. The completed MIN solution is held at 54–65° C. under low to moderate agitation until used.

The final blend is prepared by adding the specified amount of PIW slurry to a blend tank and heated under agitation to 54–60° C. The specified amount of PIF slurry is added to the tank and mixed well. The specified amount of MIN solution is added to the blend and mixed well. The specified amount of sodium chloride is added to the blend and mixed well. The specified amount of sucrose is added to the blend and mixed well to dissolve. The tricalcium phosphate is added to the blend and mixed well to disperse. The specified amount of additional water is added to the blend and mixed well. The completed final blend is held under continuous agitation at 54–60° C. If necessary, the pH is adjusted to 6.45–6.8 with 1N KOH.

After waiting for a period of not less than one minute nor greater than two hours, the blend slurry is subjected to deaeration, ultra-high-temperature treatment, and homogenization. The blended slurry is heated to a temperature from about 68° C. to about 74° C. and deaerated under vacuum. The heated slurry is then emulsified at 900 to 1100 psig. After emulsification, the slurry is heated from about 120° C. to about 122° C. and then heated to a temperature of about 149° C. to about 150° C. The slurry is passed through a flash cooler to reduce the temperature to from about 120° C. to about 122° C. and then through a plate cooler to reduce the temperature to from about 74° C. to about 79° C. The slurry is then homogenized at 3900 to 4100/400 to 600 psig. The slurry is held at about 74° C. to about 85° C. for 16 seconds and then cooled to 1° C. to about 6° C. At this point, samples are taken for microbiological and analytical testing. The mixture is held under agitation.

Standardization proceeds as follows. The stock vitamin solution (WSV) is prepared by heating the specified amount of water to 48–60° C. in a blend tank. Potassium citrate, UTM/TM premix (distributed by Fortitech of Schenectady, N.Y.), WSV premix, m-inositol, taurine, L-carnitine and choline chloride are each added to the solution in the order listed and allowed to mix well to dissolve or disperse each ingredient. 14.2 kg of the vitamin solution is added to the processed mix tank.

The stock vanilla solution is prepared by adding the specified amount of water to a blend tank. The specified amount of vanilla (distributed by Givaudan Roure of Cincinnati, Ohio) is added to the water and mixed well. 18.5 kg of vanilla solution is added to the processed mix tank and mixed well.

The stock ascorbic acid solution is prepared by adding the required amount of water to a blend tank. The specified amount of ascorbic acid is added and mixed well to dissolve. The specified amount of 45% KOH is added and mixed well. 8.4 kg of ascorbic acid solution is added to the mix tank and mixed well.

The final mix is diluted to the final total solids by adding 92.5 kg of water and mixed well. Product is filed into suitable containers prior to terminal (retort) sterilization.

EXAMPLE VI

Figure 2:
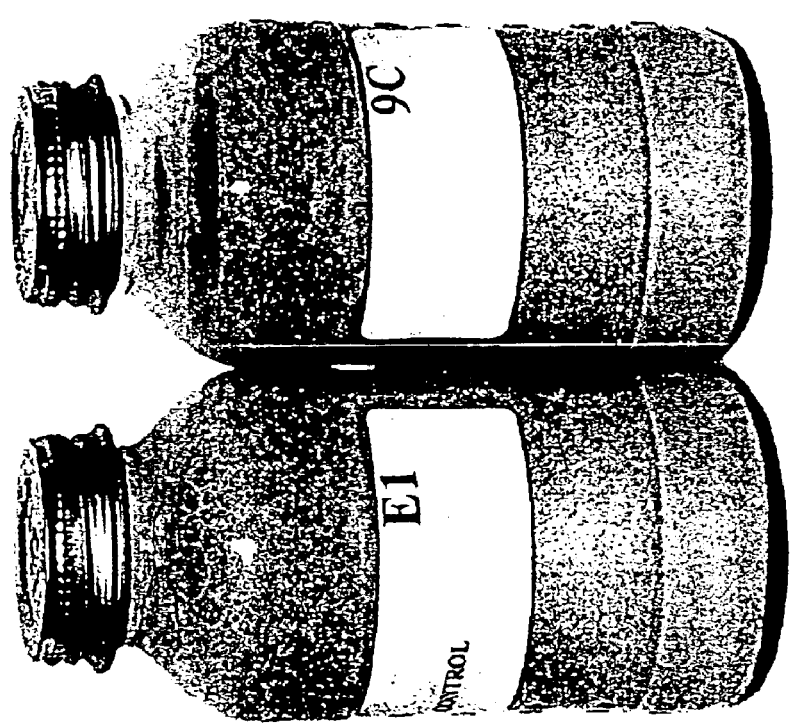
FIG. 2 is a photo of two samples: E1) the thermally processed vanilla flavored control without lutein added; and 9C) the thermally processed unflavored mix with 1.026 mg lutein/8 fl.oz.
Figure 3:
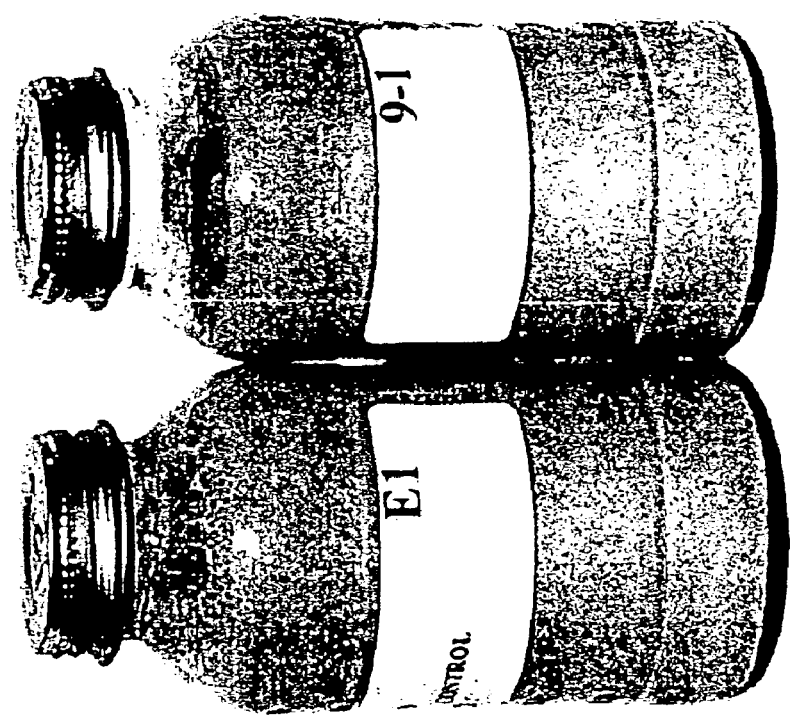
FIG. 3 is a photo of two samples: E1) the thermally processed vanilla flavored control without lutein added; and 9-2) the thermally processed unflavored mix with 0.622 mg lutein/8 fl.oz.
Figure 4:
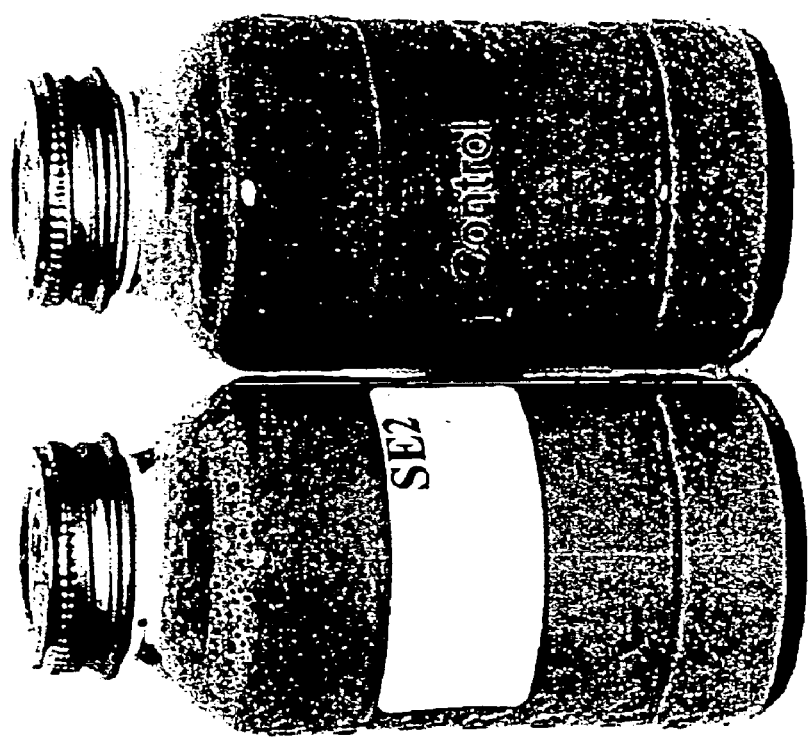
FIG. 4 is a photo of two samples: SE2) the thermally processed strawberry flavored/colored mix with 0.827 mg/8 fl.oz; and the thermally processed strawberry flavored/colored control without lutein added.
Figure 5:
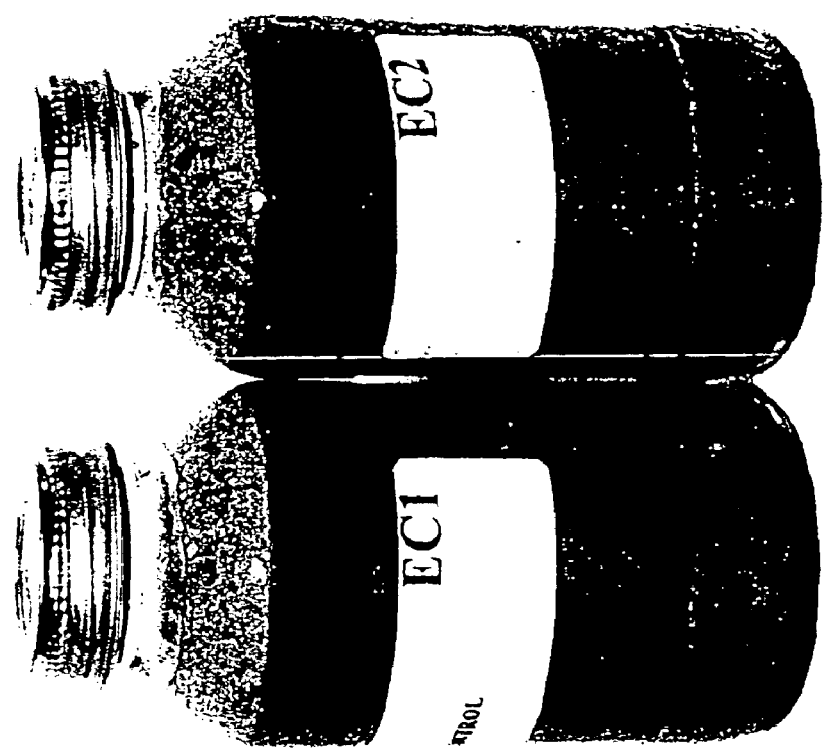
FIG. 5 is a photo of two samples: EC1) the thermally processed chocolate flavored/colored control without lutein added; and EC2) the thermally processed chocolate flavored/colored mix with 1.121 mg/8 fl.oz.

Nutritional formulas manufactured as described in Example I were analyzed for color. Table 8 lists the Hunter color values of various flavore/colored nutritionals that contain various levels of lutein compounds. Color photos of corresponding samples are attached as FIGS. 2–5 to illustrate the brightening effect of lutein compounds.

TABLE 8

Hunter Color Values

| Sample | Lutein content (mg/8 fl. oz) | L | a | b |
|---|---|---|---|---|
| 9C (Unflavored) | 1.026 | 66.6 | 0.7 | 22.2 |
| 9-1 (Unflavored) | 0.548 | 67.7 | 0.9 | 19.3 |
| 9-2 (Unflavored) | 0.622 | 66.8 | 0.8 | 20.4 |
| 9-3 (Unflavored) | 0.724 | 66.9 | 0.8 | 21.4 |
| 9-4 (Unflavored) | 0.604 | 66.8 | 0.5 | 21.1 |
| 9-5 (Unflavored) | 0.409 | 66.6 | 0.7 | 20.0 |
| E1 (Vanilla Control) | None added | 67.8 | 1.8 | 15.2 |
| VE2 (Vanilla) | 0.768 | 64.8 | 1.1 | 20.9 |
| BE2 (Butter Pecan) | 0.812 | 63.2 | 1.0 | 20.2 |
| CE2 (Coffee) | 0.824 | 56.5 | 0.6 | 17.2 |
| EE2 (Eggnog) | 0.722 | 63.2 | 1.0 | 20.6 |
| SE2 (Strawberry) | 0.827 | 56.5 | 14.4 | 14.2 |
| EC1 (Chocolate Control) | None added | 32.7 | 3.8 | 5.4 |
| EC2 (Chocolate) | 1.121 | 32.7 | 3.3 | 7.1 |
| EC3 (Chocolate) | 1.106 | 32.6 | 3.3 | 7.0 |
| EC4 (Chocolate) | 1.416 | 32.2 | 3.2 | 6.3 |

"L" value measures lightness (100.00) to darkness (0.00).
"a" value measures red when the result is a positive number, gray when 0.00 and green when the result is negative.
"b" value measures yellow when the result is a positive number, gray when 0.00 and blue when the result is negative.

The Hunter values in Table 8 describe the changes occurring in the "L", "a" and "b" axes of the three dimensional graph. When adding a colored ingredient to a nutritional base that already has a color, the expectation is that the final color will be the sum of the chromophores. For example, adding a yellow/orange compound to a brownish red base would result in a darker brown base or adding a yellow/orange compound to a white base would result in a yellow/orange base. The inventors discovered that in addition to the yellow/orange nature of the lutein compounds not dominating the final product color, the typical brown base colors of the nutritionals were diminished thereby making the final nutritional look brighter.

This is demonstrated in Table 8 by the decrease in the "a" values. The products were less red after the addition of the lutein compounds. The shift from red is further illustrated in the strawberry samples of FIG. 4. The artificial pink/red of the control is changed, with the addition of the brightening agent, to the softer more natural strawberry color. In addition to a decrease in the red values, there was an increase in the "b" values, thereby moving the final color away from the gray hues.

The light/dark values (L) of the same flavors did not significantly change with the addition of lutein. The variability of the "L" values between flavors typically correlated with the overall color of the specific flavor. For, example the nutritionals with the non-white base colors, such as chocolate, coffee and strawberry, had lower "L" values. The light base samples, such as unflavored, vanilla, butter pecan and eggnog, had higher "L" values. Further, the unflavored sample's "L" values did not shift significantly with the addition of 0.4 mg or 1.0 mg/8 fl.oz. of lutein. Importantly, while the "L" value of the light mix samples did not change significantly, the corresponding samples in FIGS. 2 and 3 which contain lutein look brighter to the eye.

The Hunter values analytically describe the specific changes occurring in the three axes. However, it is the combination of these changes that the eye detects. The result is a more appealing, brighter nutritional as illustrated in FIGS. 2–5.

We claim:

1. A method for brightening the color of thermally processed nutritionals which comprises adding at least one brightening agent selected from the group consisting of free lutein, lutein esters, free zeaxanthin, zeaxanthin esters, isomeric forms thereof, and nutritionally acceptable salts thereof to the nutritional, and wherein said brightening agent comprises from about 0.2 ppm to about 80 ppm of the nutritional.

2. A method for brightening the color of thermally processed nutritionals which comprises adding at least one brightening agent selected from the group consisting of free lutein, lutein esters, free zeaxanthin, zeaxanthin esters, isomeric forms thereof, and nutritionally acceptable salts thereof to the nutritional, and wherein said brightening agent comprises lutein esters from about 0.5 ppm to about 125 ppm of the nutritional.

3. A nutritional comprising:
   a) a protein component, which comprises from about 5 to about 80% of the total caloric content of said nutritional;
   b) a carbohydrate component, which comprises from about 10 to about 70% of the total caloric content of said nutritional;
   c) a lipid component, which comprises from about 5 to about 50% of the total caloric content of said nutritional; and
   d) at least one brightening agent selected from the group consisting of free lutein, lutein esters, free zeaxanthin, zeaxanthin esters, isomeric forms thereof, and nutritionally acceptable salts thereof.

4. The nutritional according to claim 3, wherein said brightening agent comprises from about 0.2 ppm to about 60 ppm of the nutritional.

5. The nutritional according to claim 3, wherein said brightening agent comprises lutein ester from about 0.5 ppm to about 125 ppm of the nutritional.

6. The nutritional according to claim 3, wherein said nutritional is in liquid or powder form.

7. A method for delivering nutrition by administering the nutritional according to claim 3.

8. An article of manufacture comprising a nutritional according to claim 3 in which said nutritional is packaged in a container stating that the nutritional has an improved color.

9. An adult nutritional comprising:
  a) a protein component, which comprises from about 10 to about 80% of the total caloric content of said nutritional;
  b) a carbohydrate component, which comprises from about 10 to about 70% of the total caloric content of said nutritional;
  c) a lipid component, which comprises from about 5 to about 50% of the total caloric content of said nutritional; and
  d) at least one brightening agent selected from the group consisting of free lutein, lutein esters, free zeaxanthin, zeaxanthin esters, isomeric forms thereof, and nutritionally acceptable salts thereof.

10. The nutritional according to claim 9, wherein said brightening agent comprises from about 0.2 ppm to about 60 ppm of the nutritional.

11. The nutritional according to claim 9, wherein said brightening agent comprises lutein esters from about 0.5 ppm to about 125 ppm of the nutritional.

12. The nutrition according to claim 9, wherein said nutritional is in liquid or powder form.

13. A method for delivering nutrition to an adult by administering the nutritional according to claim 9.

14. An article of manufacture comprising a nutritional according to claim 9 in which said nutritional is packaged in a container stating that the nutritional has an improved color.

15. A non-adult nutritional comprising:
  a) a protein component, which comprises from about 8 to about 25% of the total caloric content of said nutritional;
  b) a carbohydrate component, which comprises from about 35 to about 50% of the total caloric content of said nutritional;
  c) a lipid component, which comprises from about 30 to about 50% of the total caloric content of said nutritional; and
  d) at least one brightening agent selected from the group consisting of free lutein, lutein esters, free zeaxanthin, zeaxanthin esters, isomeric forms thereof, and nutritionally acceptable salts thereof.

16. The nutritional according to claim 15, wherein said brightening agent comprises from about 0.2 ppm to about 60 ppm of the nutritional.

17. The nutritional according to claim 15, wherein said brightening agent comprises lutein esters from about 0.5 ppm to about 125 ppm of the nutritional.

18. The nutritional according to claim 15, wherein said nutritional is in liquid or powder form.

19. A method for delivering nutrition to a non-adult by administering the nutritional according to claim 15.

20. An article of manufacture comprising a nutritional according to claim 15 in which said nutritional is packaged in a container stating that the nutritional has an improved color.

21. A method for masking the gray tint of thermally processed nutritionals which comprises adding at least one brightening agent selected from the group consisting of free lutein, lutein esters, free zeaxanthin, zeaxanthin esters, isomeric forms thereof, and nutritionally acceptable salts thereof to the nutritional, and wherein said brightening agent comprises from about 0.2 ppm to about 60 ppm of the nutritional.

22. A method for enhancing the appearance of thermally processed nutritionals by masking the brown tints which comprises adding at least one brightening agent selected from the group consisting of free lutein, lutein esters, free zeaxanthin, zeaxanthin esters, homeric forms thereof, and nutritionally acceptable salts thereof to the nutritional, and wherein said brightening agent comprises from about 0.2 ppm to about 60 ppm of the nutritional.

* * * * *

US006811801C1

(12) EX PARTE REEXAMINATION CERTIFICATE (6093rd)
United States Patent
Nguyen et al.

(10) Number: US 6,811,801 C1
(45) Certificate Issued: *Jan. 8, 2008

(54) METHODS AND COMPOSITIONS FOR BRIGHTENING THE COLOR OF THERMALLY PROCESSED NUTRITIONALS

(75) Inventors: Minhthy Le Nguyen, Dublin, OH (US); Bruce B. Blidner, Westerville, OH (US); Kent L. Cipollo, Westerville, OH (US)

(73) Assignee: Abbott Laboratories, Abbott Park, IL (US)

Reexamination Request:
No. 90/007,764, Oct. 13, 2005

Reexamination Certificate for:
Patent No.: 6,811,801
Issued: Nov. 2, 2004
Appl. No.: 10/012,383
Filed: Dec. 12, 2001

(*) Notice: This patent is subject to a terminal disclaimer.

(51) Int. Cl.
*A23L 1/275* (2006.01)
*A23L 1/27* (2006.01)
*A23L 1/29* (2006.01)

(52) U.S. Cl. ............................... 426/250; 426/262
(58) Field of Classification Search ............... None
See application file for complete search history.

(56) References Cited

U.S. PATENT DOCUMENTS

| 4,921,877 | A |  | 5/1990 | Cashmere et al. |
| 5,437,880 | A |  | 8/1995 | Takaichi et al. |
| 5,455,235 | A |  | 10/1995 | Takaichi et al. |
| 5,670,548 | A | * | 9/1997 | Bernhard et al. ........... 514/725 |
| 5,849,345 | A | * | 12/1998 | Giger et al. ................... 426/2 |
| 5,976,575 | A |  | 11/1999 | Gellenbeck |
| 6,132,790 | A |  | 10/2000 | Schlipalius |
| 6,190,686 | B1 |  | 2/2001 | Isager et al. |
| 6,261,598 | B1 | * | 7/2001 | Runge et al. ............... 424/456 |
| 6,261,622 | B1 |  | 7/2001 | Koguchi et al. |
| 6,287,615 | B1 | * | 9/2001 | Runge et al. ............... 426/268 |

OTHER PUBLICATIONS

Antony et al., World of Food ingredients, Apr./May 2001, Lutetin: A natural colourant and a phytonutrient for eye health protection.*
Wikipedia online definition "calorie".*
Wikipedia oline definition "dibetes mellitus".*
Wikipedia online definition "parts–per notation".*

* cited by examiner

Primary Examiner—Sharon Turner

(57) ABSTRACT

In accordance with the present invention, it has been discovered that the addition of lutein compounds to thermally processed nutritionals brightens the nutritional resulting in a more appealing color. Thermally processed liquid and powder nutritionals typically present brown and gray hues in the final color, which negatively impact the overall appeal of the nutritional. The inventors have discovered that the lutein compounds eliminate the gray and brown hues without imparting the relatively strong yellow color typically associated with lutein compounds. Additionally, the nutritionals possess long term color stability.

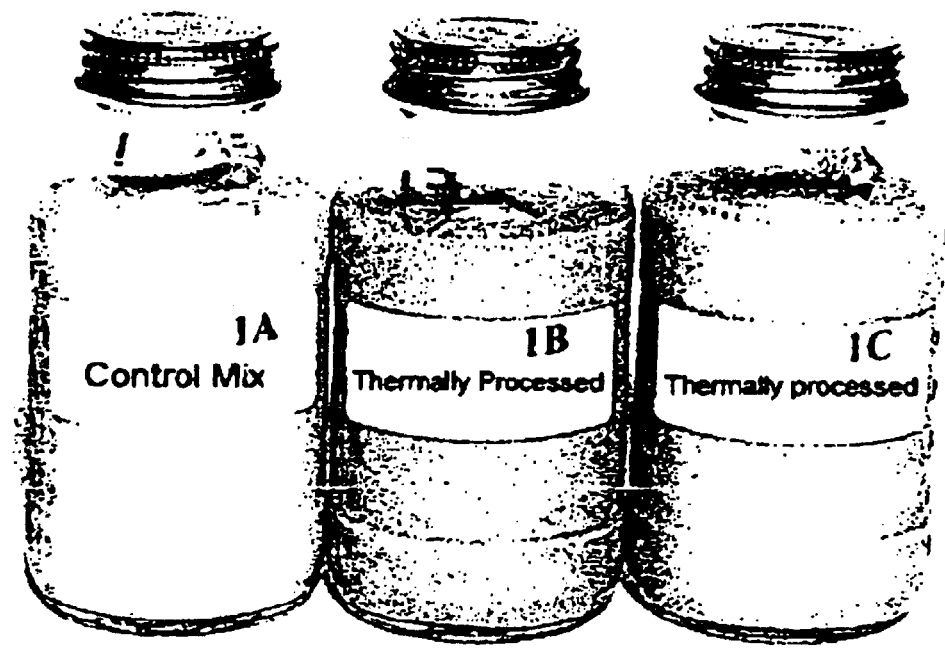

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3–20 are cancelled.

Claims 1–2 and 21–22 are determined to be patentable as amended.

New claims 23–24 are added and determined to be patentable.

1. A method for brightening the color of thermally processed nutritionals which comprises adding at least one brightening agent selected from the group consisting of free lutein, [lutein esters,] free zeaxanthin, [zeaxanthin esters,] isomeric forms thereof, and nutritionally acceptable salts thereof to the nutritional, and wherein *the total amount of* said brightening agent [comprises] *is* from about [0.2] *1* ppm to about [80] *5* ppm of the nutritional.

2. A method for brightening the color of thermally processed nutritionals which comprises adding at least one brightening agent selected from the group consisting of [free lutein,] lutein esters, [free zeaxanthin,] zeaxanthin esters, isomeric forms thereof, and nutritionally acceptable salts thereof to the nutritional, and wherein *the total amount of* said brightening agent [comprises] *is* from about [0.5] *2* ppm to about [125] *10* ppm of the nutritional.

21. A method for masking the gray tint of thermally processed nutritionals which comprises adding at least one brightening agent selected from the group consisting of free lutein, [lutein esters,] free zeaxanthin, [zeaxanthin esters,] isomeric forms thereof, and nutritionally acceptable salts thereof to the nutritional, and wherein *the total amount of* said brightening agent [comprises] *is* from about [0.2] *1* ppm to about [60] *5* ppm of the nutritional.

22. A method for enhancing the appearance of thermally processed nutritionals by masking the brown tints which comprises adding at least one brightening agent selected from the group consisting of free lutein, [lutein esters,] free zeaxanthin, [zeaxanthin esters], [homeric] *isomeric* forms thereof, and nutritionally acceptable salts thereof to the nutritional, and wherein *the total amount of* said brightening agent is [comprises] from about [0.2] *1* ppm to about [60] *5* ppm of the nutritional.

*23. A method for masking the gray tint of thermally processed nutritionals which comprises adding at least one brightening agent selected from the group consisting of lutein esters, zeaxanthin esters, isomeric forms thereof, and nutritionally acceptable salts thereof to the nutritional, and wherein the total amount of said brightening agent is from about 2 ppm to about 10 ppm of the nutritional.*

*24. A method for enhancing the appearance of thermally processed nutritionals by masking the brown tints which comprises adding at least one brightening agent selected from the group consisting of lutein esters, zeaxanthin esters, isomeric forms thereof, and nutritionally acceptable salts thereof to the nutritional, and wherein the total amount of said brightening agent is from about 2 ppm to about 10 ppm of the nutritional.*

\* \* \* \* \*